(12) United States Patent
Weyh et al.

(10) Patent No.: US 12,718,972 B2
(45) Date of Patent: Aug. 25, 2026

(54) METHOD FOR CREATING A LOW-VOLTAGE PATH OF A CELL-CONTACTING SYSTEM

(71) Applicant: Diehl Advanced Mobility GmbH, Zehdenick (DE)

(72) Inventors: Juergen Weyh, Viemau (DE); Martin Wieberger, Berlin (DE); Ingo Weber, Potsdam (DE)

(73) Assignee: Diehl Advanced Mobility GmbH, Zehdenick (DE)

( * ) Notice: Subject to any disclaimer, the term of this patent is extended or adjusted under 35 U.S.C. 154(b) by 759 days.

(21) Appl. No.: 17/372,603

(22) Filed: Jul. 12, 2021

(65) Prior Publication Data

US 2021/0344084 A1 Nov. 4, 2021

Related U.S. Application Data

(63) Continuation of application No. PCT/EP2020/052561, filed on Feb. 3, 2020.

(30) Foreign Application Priority Data

Feb. 6, 2019 (DE) ........................ 102019000856.1

(51) Int. Cl.
*H01B 13/00* (2006.01)
*H01B 13/012* (2006.01)
(Continued)

(52) U.S. Cl.
CPC ... *H01B 13/0003* (2013.01); *H01B 13/01236* (2013.01); *H01B 13/01245* (2013.01);
(Continued)

(58) Field of Classification Search
CPC ............ Y10T 29/49071; Y10T 29/532; Y10T 29/53213; Y10T 29/53243;
(Continued)

(56) References Cited

U.S. PATENT DOCUMENTS 3,769,699 A * 11/1973 Bennett .................. H05K 13/06 29/737
3,930,524 A * 1/1976 Tarbox ............ H01B 13/01245 140/93 R
(Continued)

FOREIGN PATENT DOCUMENTS

CN 101997290 A 3/2011
CN 102593773 A 7/2012
(Continued)

OTHER PUBLICATIONS

Shirakawa et al, "A Rerouting Scheme for Single-Layer Printed Wiring Boards," in IEEE Transactions on Computer-Aided Design of Integrated Circuits and Systems, vol. 2, No. 4, pp. 267-271, Oct. 1983, (Year: 1983).*

(Continued)

*Primary Examiner* — A. Dexter Tugbang

(74) *Attorney, Agent, or Firm* — Laurence A. Greenberg; Werner H. Stemer; Ralph E. Locher

(57) ABSTRACT

In a method for creating at least one low-voltage path of a cell contacting system, where the cell contacting system contains a main body, a guide head having a discharge opening for discharging an electrical conductor is provided. The guide head is guided by a machine in a predefinable path relative to the main body, and the conductor is discharged from the guide head and laid on the main body to form the low-voltage path.

15 Claims, 1 Drawing Sheet

(51) Int. Cl.

| | |
|---|---|
| ***H01M 10/48*** | (2006.01) |
| ***H01M 50/569*** | (2021.01) |
| ***H01R 43/00*** | (2006.01) |
| ***H01R 43/28*** | (2006.01) |
| *H01M 10/42* | (2006.01) |
| *H01R 43/02* | (2006.01) |

(52) U.S. Cl.

CPC ....... *H01M 10/482* (2013.01); *H01M 10/486* (2013.01); *H01M 50/569* (2021.01); *H01R 43/00* (2013.01); *H01M 10/425* (2013.01); *H01R 43/02* (2013.01); *H01R 43/28* (2013.01)

(58) Field of Classification Search

CPC ........ H01B 13/01236; H01B 13/01245; H01B 13/0003; H01R 43/28; H01R 43/00; H01R 43/02; H01M 10/482; H01M 10/486; H01M 10/569; H01M 10/425; H05K 13/06

See application file for complete search history.

(56) References Cited

U.S. PATENT DOCUMENTS

| | | | | |
|---|---|---|---|---|
| 4,692,974 | A * | 9/1987 | Cross | H01R 43/28 29/760 |
| 4,781,227 | A * | 11/1988 | Cross | Y10T 29/53243 140/92.1 |
| 5,653,015 | A * | 8/1997 | Imai | H01R 43/28 29/760 |
| 6,079,097 | A | 6/2000 | Henrici et al. | |
| 2011/0030202 | A1 | 2/2011 | Tani et al. | |
| 2012/0015550 | A1* | 1/2012 | Ikeda | H01M 10/482 439/391 |
| 2014/0023897 | A1* | 1/2014 | Suga | H01M 10/486 429/90 |
| 2015/0070025 | A1* | 3/2015 | Nakayama | H01M 50/569 324/434 |
| 2016/0268577 | A1* | 9/2016 | Ichikawa | H01M 10/482 |
| 2016/0294141 | A1 | 10/2016 | Davis et al. | |
| 2017/0279105 | A1* | 9/2017 | Zhao | H01M 10/482 |
| 2018/0108453 | A1 | 4/2018 | Schubert et al. | |

FOREIGN PATENT DOCUMENTS

| | | | | |
|---|---|---|---|---|
| CN | 107945915 A | 4/2018 | | |
| DE | 2113195 A1 | 9/1972 | | |
| DE | 19756750 C1 | 8/1999 | | |
| DE | 102012205020 A1 | 10/2013 | | |
| GB | 1493532 A | 11/1977 | | |
| JP | 2001160389 A | 6/2001 | | |
| JP | 2018006309 A * | 1/2018 | | B25J 15/08 |
| WO | 2017137577 A1 | 8/2017 | | |

OTHER PUBLICATIONS

Machine Translation of German Publication DE 2113195, Feb. 2026. (Year: 2026).*

Battery technology. Sustainable solutions in series, elringklinger, "https://www.elringklinger.de/de/produkte-technologien/elektromobilitaet/batterietechnologie-und-elektromobilitaet" (retrieved on Jan. 24, 2019).

* cited by examiner

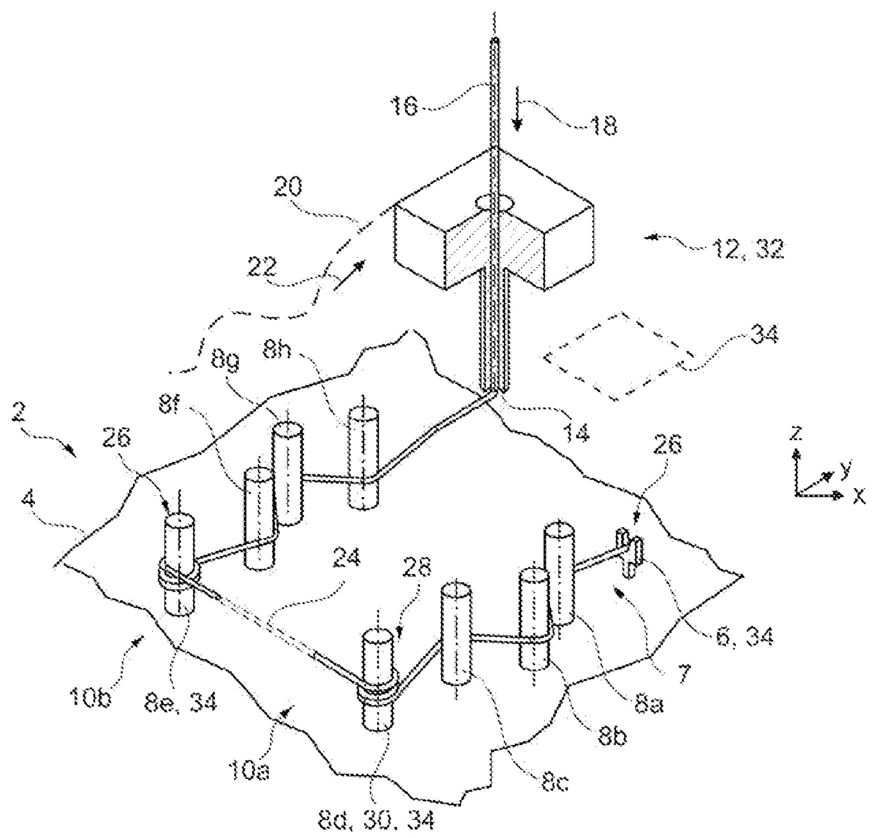
16
18
20
22
12, 32
34
8g
8h
8f
14
2
26
26
z
y
x
4
24
28
6, 34
7
10b
8e, 34
8a
8b
10a
8c
8d, 30, 34

METHOD FOR CREATING A LOW-VOLTAGE PATH OF A CELL-CONTACTING SYSTEM

CROSS-REFERENCE TO RELATED APPLICATION

This application is a continuation, under 35 U.S.C. § 120, of copending international application No. PCT/EP2020/052561, filed Feb. 3, 2020, which designated the United States; this application also claims the priority, under 35 U.S.C. § 119, of German patent application No. DE 10 2019 000 856.1, filed Feb. 6, 2019; the prior applications are herewith incorporated by reference in their entirety.

BACKGROUND OF THE INVENTION

Field of the Invention

The invention relates to a method for creating at least one low-voltage path of a cell contacting system.

A cell contacting system is, for example, known from "https://www.elringklinger.de/de/produkte-technologien/elektromobilitaet/batterietechnologie-und-elektromobilitaet" (retrieved on 24 Jan. 2019). The cell contacting system contains a support frame for accommodating busbars and electronic components. The busbars have a compensation element for reducing the effect of a force on the cell terminals. Voltage taps serve to monitor the cells and allow active/passive cell balancing. The associated temperature monitoring can be provided in the cell contacting system in an integrated manner or externally.

Electrical lines in the form of "low-voltage paths" are integrated into cell contacting systems of this kind. These are not the power-routing busbars, but rather low-voltage/low-power lines for connecting the electronic components, etc.

In current products of cell contacting systems, cable harnesses, flexible conductors and PCBs are conventional as low-voltage paths or electrical lines. In this case, installation and handling of the corresponding lines can be complex and difficult. This is the case in particular for cable harnesses since these constitute flexurally slack components which can be manipulated with difficulty in handling technology.

BRIEF SUMMARY OF THE INVENTION

The object of the invention is to improve the creation of low-voltage paths in cell contacting systems.

The object is achieved by a method as claimed in the independent patent claim for creating at least one low-voltage path of a cell contacting system, wherein the cell contacting system contains a main body. Preferred or advantageous embodiments of the invention and of other invention categories become apparent from the further claims, from the following description and from the appended FIGURE.

In the method, a guide head having a discharge opening is provided. The guide head or the discharge opening serves to discharge an electrical conductor, in particular multiple electrical conductors. For the sake of simplicity, however, the invention will be explained below on the basis of a single conductor being discharged. The guide head provided is then guided or moved by machine in a predefinable path relative to the main body. In fact, in this case the guide head and/or the main body can be moved to effect the relative movement between the two. The conductor is discharged from the guide head and thus at least in sections, in particular completely, laid or placed on the main body. The low-voltage path is formed by laying the conductor on the main body. In this case, "laying" means in particular placing, but at least fixing relative to the main body, wherein not all sections of the conductor have to come into contact with the main body.

In this case, the "low-voltage path" is to be understood in the sense explained above in contrast to power-routing conductors and serves for diagnosis, control, temperature sensing, voltage sensing and current sensing, etc. at a battery cell or battery module to or on which the cell contacting system is or is to be connected or mounted. The "low-voltage path" in this case can also be a section or portion of an actual larger low-voltage path or total path that is composed piece by piece of low-voltage paths created according to the invention. The main body is in particular a support for the low-voltage paths, busbars, electronics, etc. and is in particular configured in one or more pieces. The guide head is in particular arranged on a movement device, for example a robot arm, an x,y,z rotary guide, or the like, in order to bring about the guidance or movement of the guide head by machine.

According to the invention, therefore, electrically conductive connections (low-voltage path, conductor) are laid for conducting and processing signals in cell contacting systems. The invention describes a method for introducing at least one electrical conductor or line system, in all three translational and rotational axes, within a contacting system for batteries and battery systems. In this case a wire or a line (conductor) is guided by a device (guide head, in particular plus a robot arm or the like). The aim is to electrically connect or form the signal paths (by way of the low-voltage paths) within a cell contacting system for batteries.

According to the invention, wiring and line laying that are flexible and defined by program technology result, there is no flexurally slack cable or circuit board guidance in the handling process, wiring harness design and line laying are achieved independently of tools, the same systems and automation solutions allow the creation of different line guides, conductor cross sections and numbers of conductors, a combination of laying (guide head) and contacting heads (see below) in one manufacturing operation is possible, cable sheath insulation is not necessary in the system, and it is possible to use enameled wire or insulated conductors.

According to the invention there results an alternative to the convention solutions for the electrical connection of low-voltage paths (for example cable harness, printed circuit board (PCB), flexible conductor, leadframe, etc.). Simplification of the installation of low-voltage paths, and a high level of automatability and flexibility (variants) are achieved.

In one preferred embodiment, the movement of the guide head and/or the discharging of the conductor from the guide head are/is carried out automatically by means of a programmable control program. Automatability and flexibility of the method are achieved as a result.

In one preferred embodiment, the conductor, while being discharged from the guide head, is tensioned in relation to a conductor section that is already fixed. The fixed conductor section is one that has already been discharged from the guide head and in particular has been laid on or fastened to the main body, or constitutes an extension of the conductor in the guide head outside of the latter. The conductor section can also be fixed outside of the main body relative to the latter, for example at a fixing part of a laying machine, etc. Fixing is carried out for example by a start node or a guide/fixing element, as described below. The tension is in particular kept constant during the discharging, in particular between the start node and an end node (see below). The tension is created in particular by way of a wire tension brake. Targeted guidance of the conductor can therefore be achieved, and in particular sagging and looping, etc. of the conductor are avoided.

In one preferred embodiment, the conductor is fixed to a start node relative to the main body before or at the beginning of being laid on the main body and/or is fixed to an end node relative to the main body after or at the end of being laid on the main body. Tension can therefore be maintained on the conductor in particular and particularly easily from the beginning and after the end of the laying process.

In one preferred embodiment, the conductor is arranged on at least one guide element while being laid on the main body. The guide elements serve in particular to fix the conductor in place and/or change the direction of the conductor during and following the laying thereof. The guide elements are located in particular along the conductor between the start node and end node. In certain, for example "short", lines, in particular no guide element is required.

In one preferred variant of these embodiments—in each case if present—a clamping means and/or a holding means and/or a pin and/or a barrier and/or a channel and/or a labyrinth is/are used as the start node and/or end node and/or guide element. Components of this kind are particularly well suited to the corresponding tasks.

In one preferred variant of these embodiments—if present—the start node and/or end node and/or guide element used are those that are attached to the main body. Components of this kind are in particular a part (in particular integrally, in one piece) of the main body or are fixed to the main body releasably or non-releasably. Start and/or end nodes do not necessarily have to be attached to the main body, however. It is in particular also conceivable for start and/or end nodes to be attached to an additional component (e.g. PCB, printed circuit board), which in turn can be connected to the main body.

In one preferred embodiment, a wire or a line is used as electrical conductor. Elements of this kind are particularly well suited to the method.

In one preferred embodiment, at least two low-voltage paths are created by a common conductor being laid on the main body without interruption and then being separated into the two low-voltage paths. In particular, before the separation, the conductor is fixed on both sides of the separation point relative to the main body, for example to the abovementioned guide elements in the form of fixing elements. The separation can be carried out in particular in an automated manner by way of a corresponding separating head.

If necessary, remaining parts of lines that have been separated off and are not needed are removed. The separation is also in particular carried out by machine, in particular on or with the aid of the same movement device (exchange of the guide head) or on an additional movement device. This therefore results in a possibly more favorable alternative to the respective separate creation of two low-voltage paths.

In one preferred embodiment, the guide head contains a—in particular commercially available—wire guide nozzle or one of these is used as guide head. The wire guide nozzle is in particular tubular and/or is also referred to colloquially as "wire guide", "winding nozzle", etc.

In one preferred embodiment, a contacting head that is moved by machine is moved to a laid conductor and the contacting head makes contact between the conductor and a counterpart. This is also carried out in particular by machine, in particular (see above with regard to the separating head) on the same (exchange of the guide head/separating head) or an additional movement device. The fully automated creation including contacting of a cell contacting system with regard to low-voltage paths in particular is therefore possible.

The invention is based on the following insights, observations or considerations and also includes the following embodiments. The embodiments are in this case also referred to as "the invention", partly for the purposes of simplification. The embodiments can in this case also contain parts or combinations of the abovementioned embodiments or correspond to these and/or possibly also include embodiments which have not yet been mentioned.

The signal lines (conductors) are laid in an automated manner point-to-point (separate low-voltage paths in each case) or continuously (one continuous conductor, subsequent separation into different low-voltage paths) by way of the design and adaptation of wire laying to a flat embodiment within contacting elements (start node, end node, guide element). This ideally takes place by way of a tubular wire guide nozzle and an x,y,z phi-axis system.

According to the invention conductors are laid in all degrees of freedom without shaping tools, universal structural elements in the form of mechanical elements (start node, end node, guide element: stationarily or temporarily fixed pins, barriers, channels, labyrinths, etc.) allow laying that is exclusively program-based, there is the option of combining laying and contacting methods in one unit, geometric line laying, limited only by the conductor itself, within the predefined installation spaces is achieved, there is the possibility of combination within the laying method in six axes, and no mechanical insulation-stripping operations are necessary in the process, but they are however also possible.

Other features which are considered as characteristic for the invention are set forth in the appended claims.

Although the invention is illustrated and described herein as embodied in creating a low-voltage path of a cell-contacting system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

The FIGURE of the drawing is a diagrammatic, perspective view of a conductor being laid on a main body of a cell contacting system according to the invention.

DETAILED DESCRIPTION OF THE INVENTION

Referring now to the FIGURE of the drawings in detail, there is shown the production of a cell contacting system 2, of which the FIGURE shows an extract merely symbolically and which has a main body 4. A start node 6 is stationarily arranged and eight guide elements 8*a-h*, in this case pins or laying pins, are temporarily or fixedly arranged on the main body 4.

Two low-voltage paths 10*a,b* of the cell contacting system 2 are to be produced on the main body 4. A guide head 12 in the form of a laying head with a wire guide nozzle is provided for this purpose. The head can be moved in all three spatial directions x, y and z. The guide head 12 or the wire guide nozzle has a discharge opening 14 for discharging an electrical conductor 16 in the direction of the arrow 18.

In order to create the low-voltage paths 10*a,b*, the guide head 12 is guided by machine in the direction of arrow 22 along a path 20, which is predefined by program technology and is only indicated here, by a robot arm that is not illustrated. As a result of this, the guide head 12 moves relative to the main body 4. The conductor 16 is discharged from the guide head 12 in the direction of the arrow 18 and laid on the main body 4 to form the low-voltage paths 10*a,b*.

In the example the entire conductor 16 including an intermediate piece 24, illustrated using dashed lines, is laid.

Overall, therefore, the conductor 16, in this case a wire, is fixed to the starting point 26 of the first low-voltage path 10*a* by way of an auxiliary device, the guide head 12 or laying head or—as in this case—by way of a geometry suitable for connection, in this case the start node 6 in the form of a welding fork. The conductor 16 is then guided by the tool suitable for this purpose, in this case the guide head 12 or the wire guide nozzle. The path 20 can be determined freely in all degrees of freedom. The movement of the guide head 12 and the discharging of the conductor 16 from the guide head 12 or the discharge opening 14 are carried out automatically by means of a programmable control program. During the laying process, the wire tension is kept at an approximately constant value by way of a wire tension brake that is arranged upstream of the guide head 12 counter to the direction of the arrow 18 and is not illustrated. The tension is held in relation to the conductor section 7 that is already fixed to the start node 6. The start node 6 is therefore a winding fork in this case.

The guide elements 8*a-c* serve to guide or fix the low-voltage path 10*a* along a desired course. At the end 28 of the low-voltage path 10*a*, the conductor 16 is in turn fixed by a suitable connection, in this case a fixing winding around the guide element 8*d*. The latter thus forms an end node 30 for the low-voltage path 10*a*. In the case of a "point-to-point" operation, the conductor 16 would be cut at this point and the first low-voltage path 10*a* would be created. The guide element 8*d* (like the guide element 8*e*, see below) can therefore also be a guide element and/or contacting element in an alternative embodiment.

In the present example, however, there is an endless laying process; the conductor 16 is therefore guided further to the guide element 8*e* without interruption and without losing the wire tension, and—again by way of a fixing winding on the guide element 8*e*—is fixed there. The guide element 8*e* forms the starting point 26 of the second low-voltage path 10*b*. The low-voltage path 10*b* is then along the guide elements 8*f-h*, etc.; in the FIGURE the creation of the low-voltage path 10*b* has not yet concluded, further guide elements and another end node are not illustrated.

In order to ensure the electrical connection in the case of the endless laying process shown in the example, i.e. to ultimately create the two low-voltage paths 10*a,b*, the endless wire in the form of the conductor 16 is separated at the corresponding places, i.e. between the two low-voltage paths 10*a,b*, and the remaining parts of the wire—i.e. the intermediate piece 24, which is illustrated using dashed lines and is no longer necessary, of the conductor 16—are then removed.

Additionally, at the start node 6 and at the guide elements 8*d,e*, the conductor 16 makes electrical contact with the relevant component as counterpart 34. The guide head 12 thus simultaneously forms a contacting head 32.

In a manner not illustrated in the FIGURE, at the end of the low-voltage path 10*b* the conductor 16 is welded to, and as a result makes electrical contact with, a counterpart 34, namely a contact plate, by way of an alternative contacting head 32, namely a welding head.

The following is a summary list of reference numerals and the corresponding structure used in the above description of the invention:

2 Cell contacting system
4 Main body
6 Start node
7 Conductor section
8*a-h* Guide element
10*a,b* Low-voltage path
12 Guide head
14 Discharge opening
16 Conductor
18 Arrow
20 Path
22 Arrow
24 Intermediate piece
26 Starting point
28 End
30 End node
32 Contacting head
34 Counterpart
x,y,z Spatial direction

The invention claimed is:

1. A method for creating at least one low-voltage path, comprising the steps of:

providing a cell contacting system having a main body with a top surface;

providing a guide head having a discharge opening for discharging an electrical conductor;

guiding the guide head by a machine in a predefinable path relative to the main body, and the electrical conductor being discharged from the guide head and laid on the main body to form the at least one low-voltage path;

attaching a start node, an end node and at least one guide element to the main body, the at least one guide element extending from and above the top surface, the electrical conductor making electrical contact with the start node, end node and/or the at least one guide element;

the at least one low-voltage path being a common conductor; and creating at least two low-voltage paths from the common conductor being laid on the main body without interruption and then being separated into the at least two low-voltage paths.

2. The method according to claim 1, which further comprises carrying out a movement of the guide head and/or the discharging of the electrical conductor from the guide head automatically by means of a programmable control program.

3. The method according to claim 1, which further comprises tensioning the electrical conductor, while being discharged from the guide head, in relation to a conductor section that is already fixed.

4. The method according to claim 1, which further comprises using an apparatus selected from the group consisting of: a clamping means, a holding means, a pin, a barrier, a channel, and a labyrinth as at least one of the start node or an end node.

5. The method according to claim 1, which further comprises using a wire or a line as the electrical conductor.

6. The method according to claim 1, wherein the guide head contains a wire guide nozzle.

7. The method according to claim 1, wherein a contacting head that is moved by the machine is moved to a laid electrical conductor and the contacting head makes electrical contact between the electrical conductor and a counterpart.

8. The method according to claim 1, wherein the at least one guide element is a pin fixed to the main body.

9. The method according to claim 8, wherein the pin is releasably fixed to the main body.

10. The method according to claim 1, wherein the at least one guide element is one of a plurality of guide elements.

11. The method according to claim 10, wherein the plurality of guide elements on the main body are configured to deflect the electrical conductor, the plurality of guide elements extending up from and above the main body.

12. The method according to claim 11, which further comprises fixing the electrical conductor to at least one of the plurality of guide elements.

13. The method according to claim 10, which further comprises fixing the electrical conductor to at least one of the plurality of guide elements.

14. A method for creating low-voltage paths, comprising the steps of:

providing a cell contacting system having a main body;

providing a guide head having a discharge opening for discharging an electrical conductor;

guiding the guide head by a machine in a predefinable path relative to the main body, and the electrical conductor is discharged from the guide head and laid on the main body to form at least one low-voltage path being a common conductor;

creating at least two low-voltage paths from the common conductor being laid on the main body without interruption and then being separated into the at least two low-voltage paths;

attaching a start node, an end node and a plurality of guide elements on the main body for deflecting the electrical conductor, the guide elements extending up from and above the main body;

wrapping the electrical conductor completely around at least one of the plurality of guide elements; and the electrical conductor making electrical contact with the start node, end node and/or the at least one wrapped guide element.

15. A method for creating low-voltage paths, comprising the steps of:

providing a cell contacting system having a main body;

providing a guide head having a discharge opening for discharging an electrical conductor;

guiding the guide head by a machine in a predefinable path relative to the main body, and the electrical conductor is discharged from the guide head and laid on the main body to form at least one low-voltage path being a common conductor;

creating at least two low-voltage paths from the common conductor being laid on the main body without interruption and then being separated into the at least two low-voltage paths;

attaching a start node, an end node and a plurality of guide elements on the main body for deflecting the electrical conductor, the guide elements extending up from and above the main body;

wrapping the electrical conductor completely around two of the plurality of guide elements being two wrapped guide elements, the electrical conductor making electrical contact with the start node, end node and/or the two wrapped guide elements; and creating the at least two low-voltage paths from the common conductor being laid on the main body without interruption by separating the conductor at a point between the two wrapped guide elements.

* * * * *